United States Patent [19]
Rhode

[11] Patent Number: 5,639,095
[45] Date of Patent: Jun. 17, 1997

[54] LOW-LEAKAGE AND LOW-INSTABILITY LABYRINTH SEAL

[75] Inventor: David L. Rhode, College Station, Tex.

[73] Assignee: Twentieth Technology, College Station, Tex.

[21] Appl. No.: 593,284

[22] Filed: Jan. 29, 1996

Related U.S. Application Data

[63] Continuation of Ser. No. 85,651, Jun. 30, 1993, abandoned, which is a continuation-in-part of Ser. No. 799,903, Nov. 26, 1991, Pat. No. 5,244,216, which is a continuation of Ser. No. 379,328, Jul. 12, 1989, abandoned, which is a continuation-in-part of Ser. No. 140,634, Jan. 4, 1988, abandoned.

[51] Int. Cl.$^6$ ............................................ F16J 15/00
[52] U.S. Cl. ............................ 277/1; 277/53; 277/56
[58] Field of Search ................................ 277/53, 55, 56, 277/57, 1

[56] References Cited

U.S. PATENT DOCUMENTS

| | | | |
|---|---|---|---|
| 835,836 | 11/1906 | Schulz . | |
| 1,020,699 | 3/1912 | Kieser . | |
| 1,419,927 | 6/1922 | Hodgkinsen | 277/56 |
| 1,482,031 | 1/1924 | Parsons et al. . | |
| 1,689,735 | 10/1928 | Losel | 277/56 |
| 1,831,224 | 11/1931 | Bauman | 277/57 |
| 1,831,242 | 11/1931 | Hanzlik | 277/55 |
| 1,908,804 | 5/1933 | Wiberg | 277/57 |
| 2,281,905 | 5/1942 | Young | 277/56 |
| 3,231,285 | 1/1966 | Weltmer et al. | 277/53 |
| 3,251,601 | 5/1966 | Harvey | 277/53 |
| 3,262,635 | 7/1966 | Smuland | 230/116 |
| 3,558,238 | 1/1971 | Van Herpt | 277/53 |

(List continued on next page.)

FOREIGN PATENT DOCUMENTS

| | | |
|---|---|---|
| 812092 | 7/1936 | France . |
| 433898 | 9/1926 | Germany . |
| 494347 | 3/1930 | Germany . |
| 650759 | 9/1937 | Germany . |
| 2000314 | 7/1971 | Germany . |
| 781518 | 11/1980 | U.S.S.R. . |
| 13004 | of 1906 | United Kingdom . |
| 28141 | of 1909 | United Kingdom . |
| 135949 | 12/1919 | United Kingdom . |
| 272497 | 6/1927 | United Kingdom . |
| 465087 | 4/1937 | United Kingdom . |

OTHER PUBLICATIONS

H. A. Koenig, W. W. Bowley, "Labyrinth Seal Analysis," an ASME publication, *American Society of Mechanical Engineers, Journal of Lubrication Technology*, Paper No. 72–Lub–C, 1972.

J. I. Fasheh, "Review and Summary of Labyrinth Seal Theory and Design," Rocketdyne North American Rockwell, TMR 2115–3351, pp. 41–44, 67 and 71, Dec. 6, 1972.

L. P. Ludwig and R. C. Bill, "Gas Path Sealing in Turbine Engines," NASA Technical Memorandum 73890 (Revised) AVRADCOM, Technical Report 78–35(PL), Oct. 24–26, 1978.

R. Flower, "Brush Seal Development System," AIAA 90–2143, AIAA/SAE/ASME/ASEE 26th Joint Propulsion Conference, Jul. 16–18, 1999, *American Institute of Aeronautics and Astronautics, Inc.*

*Primary Examiner*—Daniel G. DePumpo
*Attorney, Agent, or Firm*—Baker & Botts, L.L.P.

[57] ABSTRACT

Improved labyrinth seal designs are disclosed. The present invention relates to labyrinth seal systems with selected sealing surfaces and seal geometry to optimize flow deflection and produce maximum turbulent action. Optimum seal performance is generally accomplished by providing sealing surfaces and fluid cavities formed to dissipate fluid energy as a function of the geometry of the sealing surfaces along with the position and size of the fluid cavities formed between members of the labyrinth seal system. Improved convex surfaces, annular flow reversal grooves, flow deflection blocks and rough, machined surfaces cooperate to enhance the performance of the labyrinth seal systems. For some labyrinth seal systems a mid-cavity throttle and either rigid teeth or flexible spring teeth may be included.

35 Claims, 7 Drawing Sheets

U.S. PATENT DOCUMENTS

| | | | |
|---|---|---|---|
| 3,594,010 | 7/1971 | Warth | 277/53 |
| 3,630,529 | 12/1971 | Ball | 277/22 |
| 3,701,536 | 10/1972 | Matthews et al. | 277/56 |
| 3,865,504 | 2/1975 | Benz | 415/113 |
| 3,897,169 | 7/1975 | Fowler | 415/172 |
| 3,940,153 | 2/1976 | Stocker | 277/57 |
| 4,042,248 | 8/1977 | Williamitis | 277/138 |
| 4,273,510 | 6/1981 | Ambrosch et al. | 415/119 |
| 4,335,886 | 6/1982 | Frey et al. | 277/25 |
| 4,338,080 | 7/1982 | Grandcolas et al. | 432/115 |
| 4,398,725 | 8/1983 | Maegawa | 277/192 |
| 4,405,137 | 9/1983 | Webb | 277/153 |
| 4,433,848 | 2/1984 | Williams | 277/199 |
| 4,500,098 | 2/1985 | Wilcox et al. | 277/170 |
| 4,961,588 | 10/1990 | Brienza | 277/148 |
| 5,100,158 | 3/1992 | Gardner | 277/53 |

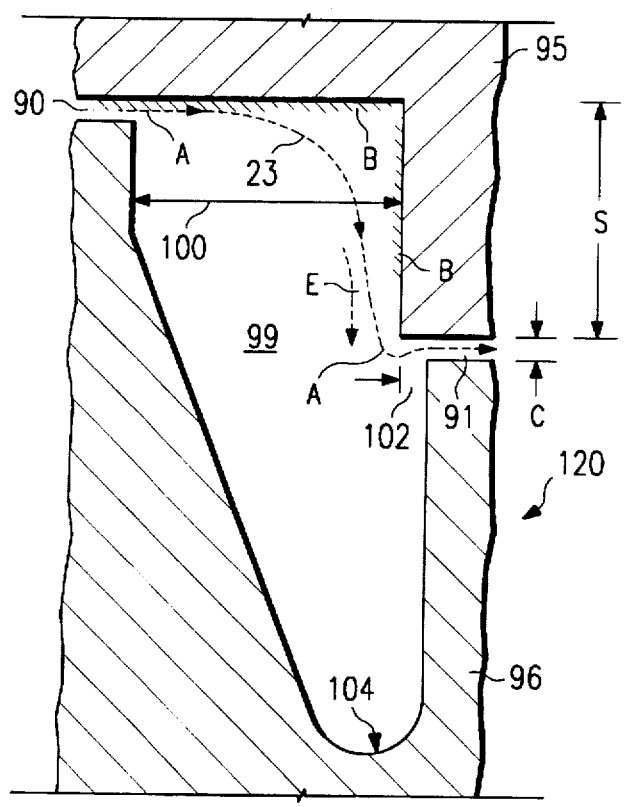

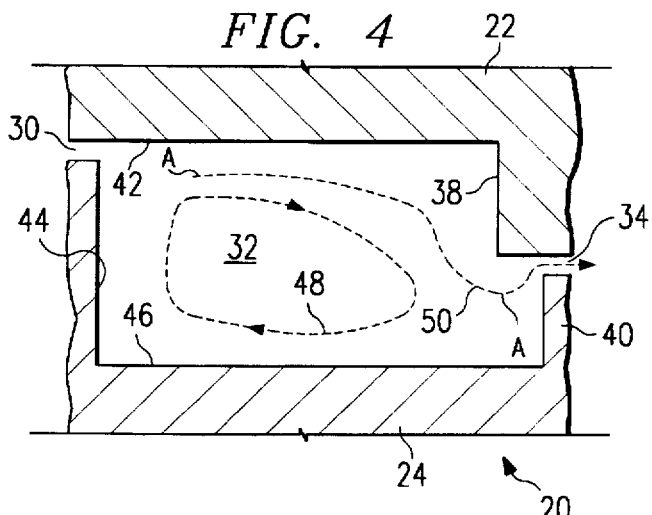
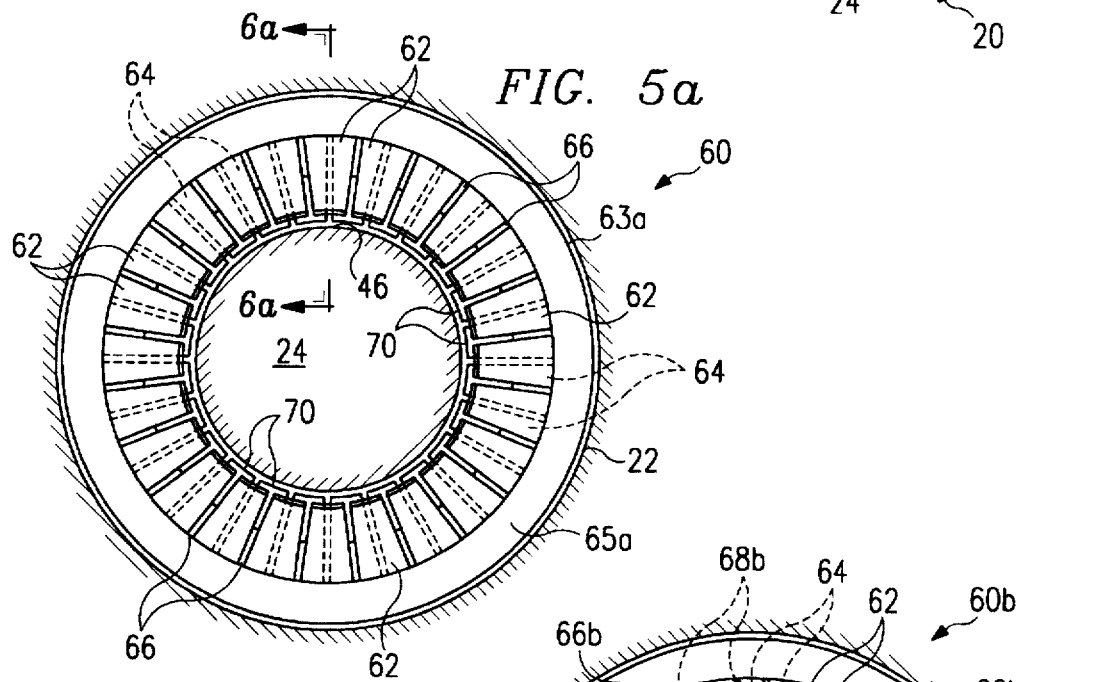
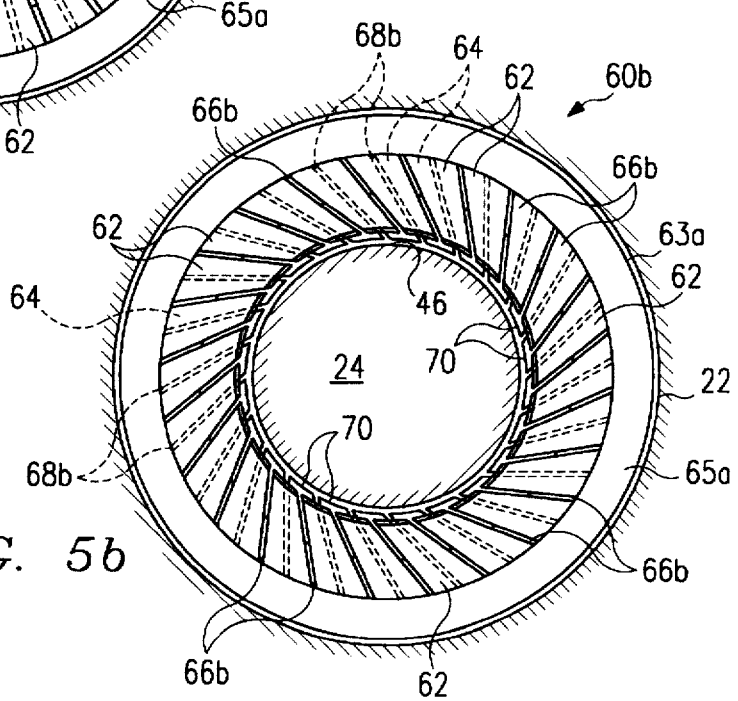

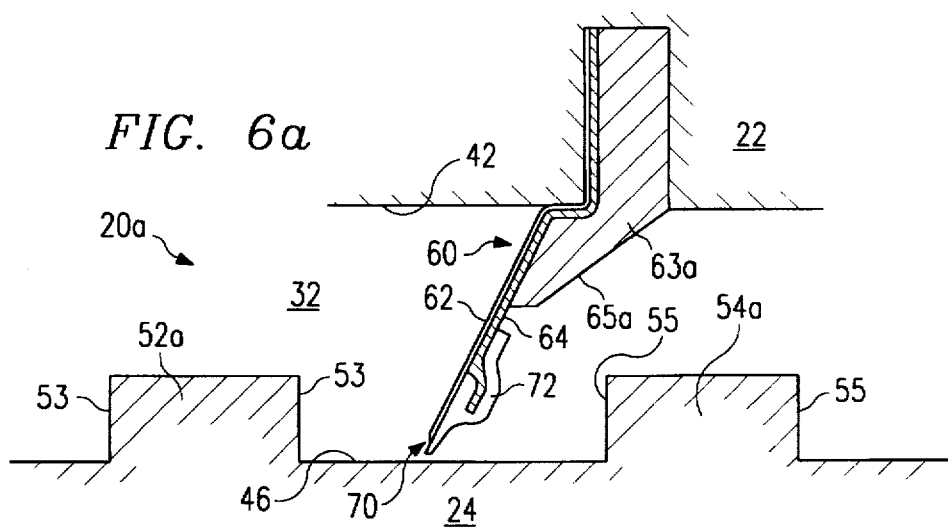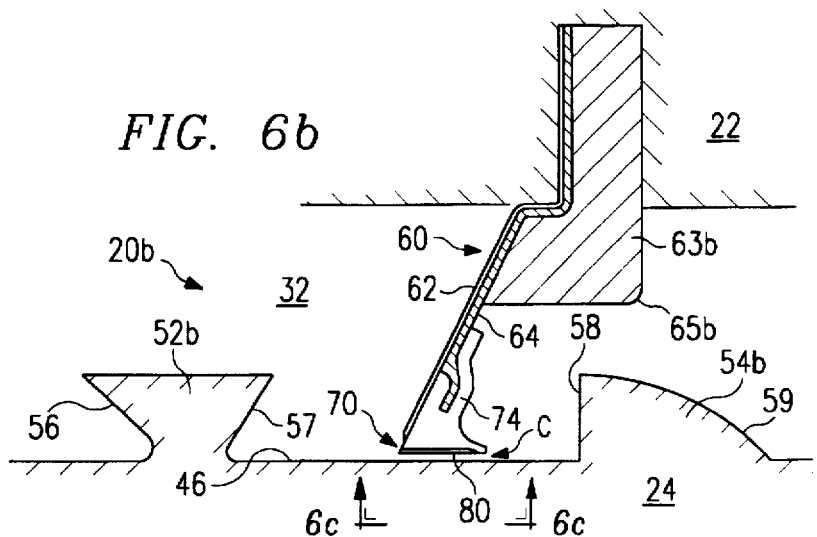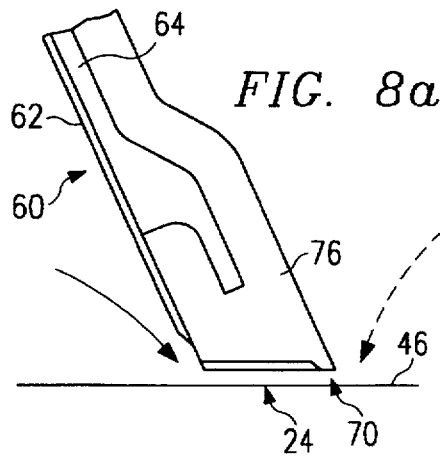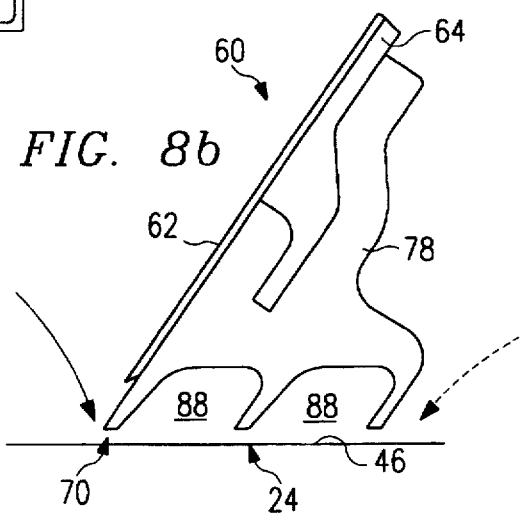

1

LOW-LEAKAGE AND LOW-INSTABILITY LABYRINTH SEAL

NOTICE

This application is a continuation of application Ser. No. 08/085,651 filed Jun. 30, 1993, entitled "Low-Leakage and Low-Instability Labyrinth Seal," by David L. Rhode, now abandoned; which is a continuation-in-part of application Ser. No. 07/799,903 filed Nov. 26, 1991, now U.S. Pat. No. 5,244,216 granted Sep. 14, 1993; which is a continuation of application Ser. No. 07/379,328 filed Jul. 12, 1989, now abandoned; which is a continuation-in-part of application Ser. No. 07/140,634 filed Jan. 4, 1988, now abandoned. The disclosure of these applications is incorporated herein by reference.

This invention was made with Government support under Contract No. NAGW-1194 awarded by NASA. The Government has certain rights in this invention.

TECHNICAL FIELD OF THE INVENTION

The present invention relates to improved designs for high performance labyrinth seals. More specifically, the present invention relates to labyrinth seals wherein the geometry of the sealing surfaces may be optimized to enhance flow deflection and produce maximum turbulent action. Optimum seal performance is accomplished by selecting sealing surfaces and seal geometry to established minimum clearance between selected portions of the seal and maximum flow turbulence between other selected portions of the seal.

BACKGROUND OF THE INVENTION

Labyrinth seals are often used to reduce or control fluid leakage in systems having equipment such as gas and steam turbines, compressors, pumps, and other types of rotating equipment where fluid flow may occur between two relatively rotating members. More particularly, labyrinth seals are frequently used in sealing between elements such as a rotating shaft and an associated stator housing to inhibit undesirable fluid flow between the exterior of the shaft and interior of the stator. When incorporated with a pump, a labyrinth seal may be relied upon to inhibit leakage along the pump shaft of high pressure fluid being discharged by the pump.

A labyrinth seal is generally characterized by a series of cavities or grooves formed along the adjacent surfaces of two relatively rotatable members such as a rotor on a rotating shaft and a stator on an adjacent, fixed housing. These members generally define a partial barrier between areas of high and low fluid pressure. At successive stations along the length of the labyrinth seal, adjacent surfaces of the rotatable members are situated in close proximity to each other to define annular slit-like orifices. In many labyrinth seal designs, a series of cavities or chambers are formed at these stations in order to retard fluid flow through the seal to a desired level.

In operation, previously available labyrinth seal designs often form a fluid barrier between the rotatable members by forcing high velocity fluid to navigate irregularly spaced adjacent surfaces formed between the relatively rotatable members. The fluid is forced to pass sequentially through slit-like orifices to enter enlarged cavities where the fluid energy is largely dissipated in turbulence. One of the basic concepts of any labyrinth seal design is to create a highly frictional fluid flow path. Such a flow path will convert pressure energy into velocity energy. A large portion of the velocity energy will be dissipated as heat energy via turbulent action.

One source of turbulence is created as a result of wall shear friction between high velocity fluids and irregularly spaced adjacent surfaces of the seal. A second and often more important source of turbulence results from intense free shear layer friction between a high velocity fluid jet discharging from an orifice and relatively slow moving fluid in a large cavity immediately downstream from the orifice. As a result of the combination of these and other friction components, pressure energy is substantially reduce downstream of each orifice in a multi-cavity labyrinth seal system. The substantially reduced pressure in a given cavity formed downstream from a particular orifice results in smaller pressure changes occurring across additional downstream orifices. The net result is overall reduced leakage across the labyrinth seal.

A variety of labyrinth seal designs have evolved to take advantage of these principles of dissipating fluid energy. One early design is seen in U.S. Pat. No. 1,020,699—Kieser. In this design, a centrifugal pump is provided with a stepped and grooved sealing surface such that the kinetic energy of the fluid flow across the sealing surface is somewhat dissipated through designed turbulence.

In another such design, U.S. Pat. No. 1,482,031—Parsons, a labyrinth seal is characterized by a radially stepped surface provided along the rotor, the stator being provided with a corresponding set of barrier members or collars disposed in close relationship thereto. In this fashion, high pressure fluid moving across the sealing surface will encounter interference; thus, minimizing leakage. In yet another design, U.S. Pat. No. 3,940,153—Stocker, the labyrinth seal is characterized by a succession of annular orifices or clearances between sealing teeth or knives on one member, and generally cylindrical surfaces or lands on the other. In combination, the sealing system defines a doubly recurved flow path from each orifice to the orifice next downstream.

Such prior art systems employ the use of sharp turns in the fluid flow path to provide additional fluid friction or resistance to flow. The through-flow fluid is forced to "zig-zag" or "serpentine" through the seal. The turning of the through-flow fluid in the prior art is often achieved through the use of wall positioning and wall curvature. Many of the prior art configurations were designed without precise quantitative data and without fully appreciating the kinetics involved in turbulence generation and energy dissipation associated with a sealing system. The concern of the prior art has generally been to increase the wall shear friction through the use of long and tortuous flow paths between each pair of annular orifices. By focusing on the use of wall shear stress, the prior art often neglected the turbulence generating potential of a free (i.e. away from wall) shear layer.

This reliance on wall shearing to turn the through-flow fluid has caused prior art devices to be characterized by a variety of "knives" or "lands." These features have been combined either acutely or irregularly to increase the wall shear friction between the fluid and the sealing surfaces of the seal. This emphasis on wall shearing has resulted in prior art labyrinth seal systems having intricate and complex sealing surfaces.

The prior art has continued to employ wall shear friction to turn the through-flow fluid. More particularly, prior art devices have relied upon wall positioning and wall curvature to turn the fluid while failing to optimize the potential of fluid turning available in configurations capable of producing free shear layers.

This failure is particularly evident when prior art seals have been adapted for operation in harsh operating environments, such as military and space applications. To maintain an adequate seal in such harsh environments, a trend has been to increase the number of sealing cavities or chambers, as well as increasing the complexity of the relative geometry of adjacent sealing surfaces. Prior seals have also included the use of alreadable or honeycomb matrix materials attached to either the stationary or the rotating member of the seal. In a further effort to achieve more effective sealing, prior seals have increasingly restricted the relative clearance between the moving seal members by diverting a portion of the fluid through a system of intricately machined slots.

As a result of these trends in labyrinth seal design, many contemporary labyrinth seals have been quite expensive to produce due to the intricate machining required to finish each sealing surface. Such complex sealing surfaces have also been somewhat fragile and thus prone to failure in rigorous applications due to the inherent structural weakness of the thinly structured sealing teeth and associated buttresses. The increasingly small, tight tolerances required between the rotating members of such seals are often impractical when the rotary drive shaft is prone to move off center or wobble. Most important of these deficiencies, prior art sealing systems have generally failed to achieve optimum sealing efficiency in harsh operating environments.

SUMMARY OF THE INVENTION

In accordance with the present invention, labyrinth seal designs and methods for optimizing the performance of labyrinth seal systems are provided which substantially eliminate disadvantages and problems associated with previous labyrinth seal systems. Labyrinth seal systems manufactured in accordance with the present invention may be used with new equipment and refurbished equipment. Such labyrinth seal systems will allow increased operating performance from both new equipment and refurbished equipment.

The present invention provides improved sealing systems with the geometry of the sealing surfaces designed to optimize fluid flow deflection and to produce maximum turbulent action to dissipate fluid energy. High velocity, sharply curved, free shear layers and multiple cavities are combined to improve seal performances. As a result of this invention, turbulence generation and thus thermal dissipation of fluid energy are enhanced across the length of the labyrinth seal system resulting in improved seal performance.

The present invention was developed as a result of extensive design optimization studies of fluid leakage characteristics in numerous labyrinth seal systems. An advanced finite difference computer program as well as a test rig were used to solve the governing fluid flow equations containing known fluid flow physical phenomena with state-of-the-art computer modeling. By varying selected design variables for each computer solution, an optimum design for these variables was found over a desired operating range for the equipment containing the associated labyrinth seal. Often the optimum design resulted from an important trade-off between opposing energy dissipating mechanisms.

The present invention dissipates fluid energy and thus restricts fluid flow through a labyrinth seal system by a combination of convex surfaces, fluid cavities, annular flow reversal grooves, rough surface finishes on selected portions of the fluid cavities and flexible knives or spring teeth as appropriate. The optimum seal is created by employing specific geometric relationships derived from solutions obtained through the use of applicable computer models and experimental test rigs.

An important technical advantage of the present invention includes novel configurations for projections from the rotor and/or stator into the fluid flow path between the rotor and stator. The projections employed in the present invention use the net force on a fluid particle, involving turbulence generation and heat dissipation, to turn through-flow fluid and thereby increase the labyrinth seal system's resistance to such fluid flow. The projections include concave, convex and flat surfaces which maximize flow turbulence. For some applications, seal performance may be enhanced by placing a mid-cavity orifice or throttle in selected fluid cavities. Examples of a mid-cavity orifice or throttle satisfactory for use with the present invention include a radial projection and an associated convex surface or a plurality of flexible spring teeth disposed within the selected fluid cavities.

The present invention results in seal surfaces and components which may be easily machined and are resistant to damage from shaft vibrations which may result in rubbing between rotating and stationary members of the labyrinth seal system. The present invention also minimizes any vibration which may result from eccentricities in a rotating shaft relative to its housing and/or undesired circumferential fluid flow around the exterior of the rotating shaft.

In one embodiment of the present invention, a radially stepped labyrinth seal is formed between a rotor and a stator. The seal itself involves a rotary shaft having a rotor with a plurality of axially spaced, angularly stepped portions with high pressure sides and low pressure sides, and a stationary housing having a stator surrounding the shaft, and having corresponding second annular stepped portions on its inner periphery. The combination of the rotor and stator define a restricted fluid flow path therebetween. In a general embodiment of the invention, the height S of a projection is defined by a function of the minimum clearance C, between edges of the projection and the adjacent portion of a convex surface.

In a specific embodiment of the present invention, a radial projection is formed in the wall of the stator and is located substantially opposite a convex surface on the low pressure side of a radial projection from the rotor. An alternative embodiment of the present invention includes a radial projection formed in the rotor and located substantially opposite from a convex surface on the low-pressure side of a radial projection from the stator. The convex surface in both embodiments is provided to guide or direct fluid flow into a recessed portion of the fluid cavity adjacent to the respective convex surface. Minimum clearance C is provided between each radial projection and its associated convex surface to further assist in directing fluid flow into the associated recessed cavity.

A further embodiment of the present invention includes providing semi-elliptical annular grooves in various surfaces associated with the stator and/or the rotor. The semi-elliptical grooves are oriented in opposition to the direction of fluid flow through the labyrinth seal system. The semi-elliptical grooves may be formed in radial projections from the stator and/or rotor or in other surfaces associated with the fluid cavities.

An important technical advantage of the present invention includes providing flexible knives or spring teeth to establish a fluid barrier within selected portions of the labyrinth seal system. The spring teeth may include end fittings which further restrict fluid flow through the labyrinth seal system. If desired, the end fittings on the spring teeth may provide a fluid trap to increase the local pressure to lift the spring teeth tips radially outward only about 0.001 inches from the adjacent surface to achieve an extremely small clearance. The spring teeth and their associated end fittings are preferably designed to wear only slightly during the first few hours of operating the equipment associated with the labyrinth seal system. This concept allows the minimum required clearance between rotating and stationary components of the seal system.

An additional technical advantage of the present invention includes providing spoilers or boundary layer breakers on radial projections and other selected surfaces of the fluid cavities to increase turbulent intensity within the labyrinth seal system. Also, machine finishes or rough surfaces may be provided on selected portions of the fluid cavities such as the convex surfaces to further enhance turbulent flow within each fluid cavity.

Another aspect of the present invention provides an effective seal even if there is relative radial displacement between the rotor and stator due to vibration or stresses from imbalanced fluid pressures or large temperature differentials. The present invention allows designing an effective seal even if the two relatively rotating members are positioned slightly out of alignment. Also, the prior art use of large open cavities (recesses) are partially replaced with areas of very small clearance between rotor and stator surfaces. This provides a blockage of the circumferential flow area. In this manner, the small clearances reduce the circumferential component of fluid velocity associated with the shaft undergoing a radial excursion. Thus, the rotor dynamic direct stiffness coefficient is increased and the tendency for shaft vibration (whirl) is also reduced. By alternating between tight clearance and enlarged fluid cavities, circumferential pressure variations or whirl vibrations may be further reduced. For embodiments with flexible or spring teeth, the teeth will flex to avoid damage to the teeth tips or free ends during shaft vibrations and/or misalignment.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a drawing in longitudinal section with portions broken away of a prior art labyrinth seal, taken in a plane containing the axis of rotation;

FIG. 2 is a drawing in longitudinal section with portions broken away of a labyrinth seal having fluid flow from left to right along its longitudinal axis (axial flow);

FIG. 3 is a drawing in longitudinal section with portions broken away of a labyrinth seal having fluid flow along its radial axis (radial flow);

FIG. 4 is a schematic drawing of a fluid cavity formed in the labyrinth seal system of FIGS. 2 and 3, illustrating the fluid flow path associated with annular inlet and outlet orifices between adjacent stepped surfaces or radial projections;

FIG. 5a is a drawing in radial section with portions broken away showing one embodiment of the present invention illustrating flexible knives or spring teeth disposed between a stator and a rotor;

FIG. 5b is a drawing in radial section with portions broken away showing an alternative embodiment of the flexible knives or spring teeth of FIG. 5a;

FIG. 6a is a schematic drawing in longitudinal section with portions broken away taken along lines 6a—6a of FIG. 5a;

FIG. 6b is a drawing in longitudinal section with portions broken showing flexible knives or spring teeth disposed within a fluid cavity between a stator and a rotor incorporating another embodiment of the present invention;

FIG. 6c is a drawing taken along lines 6c—6c of FIG. 6b showing the end fitting on one of the flexible knives or spring teeth of FIG. 6b;

FIG. 7 is an isometric drawing in elevation with portions broken away showing the flexible knives or spring teeth of FIG. 6a;

FIG. 8a is a schematic drawing showing an alternative embodiment of an end fitting used with the flexible knives or spring teeth of FIG. 6a;

FIG. 8b is a schematic drawing showing an alternative embodiment of an end fitting used with the flexible knives or spring teeth of FIG. 6a;

DETAILED DESCRIPTION OF THE INVENTION

Figure 7:
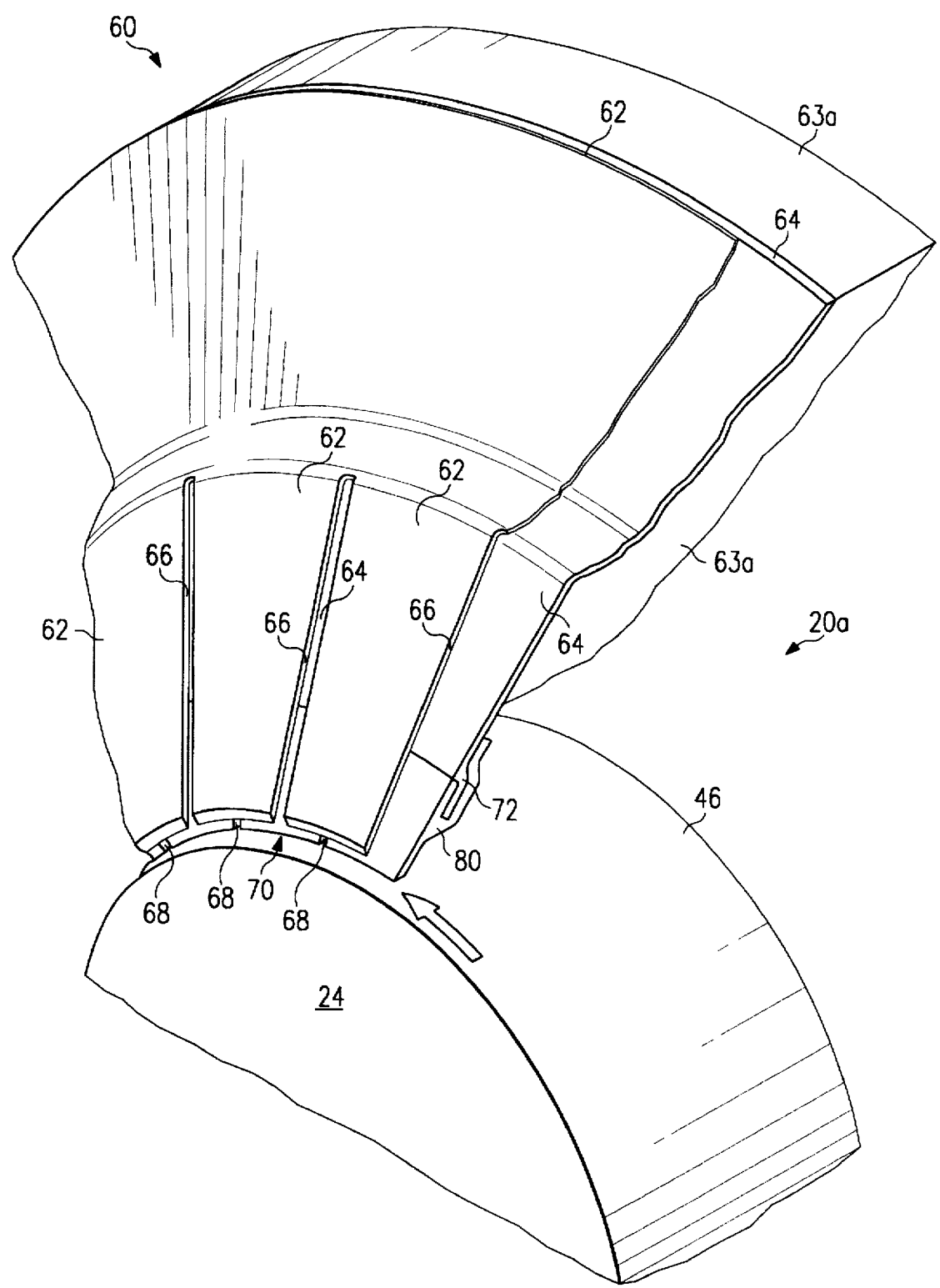
Figure 9:
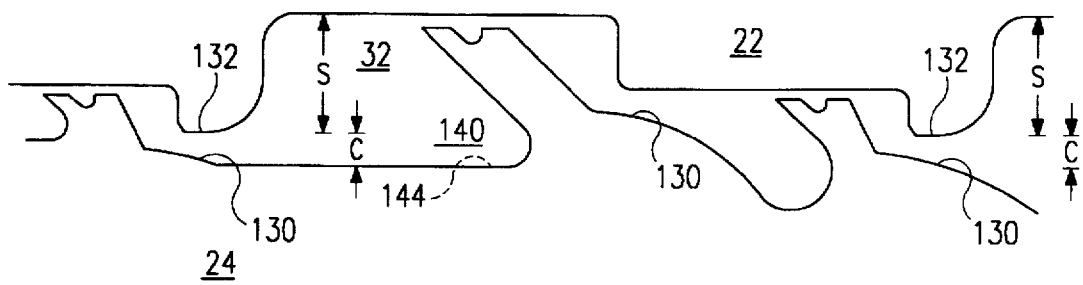
FIG. 9 is a schematic drawing in longitudinal section taken along the axis of rotation with portions broken away showing a labyrinth seal system with radial projections, sealing surfaces, fluid cavities, and semi-elliptical annular grooves incorporating the present invention.

The preferred embodiments of the present invention and its advantages are best understood by referring to FIGS. 1–18 of the drawings, like numerals being used for like and corresponding parts of the various drawings.

FIG. 1 is a longitudinal section showing a portion of a prior art labyrinth seal system 120 manufactured by the Rocketdyne Division of Rockwell International. The seal design illustrated in FIG. 1 is used in high pressure liquid hydrogen fuel pumps associated with the United States space shuttle program.

Labyrinth seal system 120 is characterized by fluid inlet orifice 90 and fluid outlet orifice 91 formed between stator 95 and rotor 96. In this design, fluid inlet orifice 90 is at an area of higher pressure and upstream from fluid outlet orifice 91. Interposed between inlet 90 and outlet 91 is fluid cavity 99. Areas of high radial and longitudinal flow velocity (and hence highest turbulence) in this design are represented at points A. Areas of leakage flow spreading are shown by point E. Areas of high wall shear friction are shown by hatching at point B.

FIG. 2 generally illustrates labyrinth seal system 20 comprising stator 22 and rotor 24. Rotor 24 may be an integral part of or a separate component attached to rotary shaft 26. Stator 22 will preferably extend from and comprise part of a housing (not shown). The housing may comprise a portion of a compressor, turbine, pump, rotary kiln, etc. (not shown).

Labyrinth seal system 20 may contain either gas, liquid or a multiphase fluid such as foam at different levels of pressure. Seal system 20 includes an alternating arrangement of fluid cavities 32 and flow channels or orifices 34. For the sealing configuration illustrated in FIG. 2, the higher pressure or upstream end of seal 20 is at inlet 30, and the lower pressure or downstream end of seal 20 is at outlet 36. Outlet 36 of seal 20 may be vented to atmosphere or sub-atmosphere pressure depending on the particular application for which seal 20 is used. For some applications, both inlet 30 and outlet 36 of seal 20 may be at quite high pressures, but a pressure differential will preferably exist between inlet 30 and outlet 36 in any case.

The relative position of rotor 24 and stator 22 may be interchanged as desired from that shown in FIG. 2. Labyrinth seal system 20 is preferably designed for fluid flow from the left to the right. If desired labyrinth seal system 20 may be modified for fluid flow from the right to the left.

The previous description applies generally to conventional labyrinth seals commonly employed in the art. The present invention, however, is directed to specific labyrinth seal systems with the geometry of the sealing surfaces between rotor 24 and stator 22 determined as a function of the relative location of stepped surfaces or radial projections on stator 22 and rotor 24 with regards to relative clearance and various surface configurations as will be described later.

Various materials and/or abradable surfaces (not shown) may be attached or sprayed on to rotor 24 and/or stator 22 to fill in the clearance region formed between the edges of the first annular stepped portion and the edges of the second annular stepped portion. Examples of such materials include various plastics as well as alloys of lead, tin, copper and antimony. The addition of such materials particularly with a honeycomb or matrix structure further increases the fluid resistance of the associated labyrinth seal system and enhances its ability to prevent seal leakage.

Most labyrinth seals may be configured for either axial flow as shown in FIG. 2 or radial flow as shown in FIG. 3. Labyrinth seal system 220 shown in FIG. 3 demonstrates that the components of labyrinth seal system 20 of FIG. 2 may be configured for use with radial flow as compared to axial flow.

Referring to FIG. 3, labyrinth seal system 220 is disposed between housing 228 and its associated stator 22 and rotating shaft 26 and its associated rotor 24. High pressure fluid enters between stator 22 and rotor 24 through inlet orifice 30 into cavity 32, the downstream end of which is partially blocked by a stepped portion or projection 38 from rotor 24 in combination with a second stepped portion or projection 40 from stator 22. Projections 38 and 40 are shown perpendicular to the axis of fluid flow. However, projections 38 and 40 may also adopt various other angled or curved configurations with respect to the axis of fluid flow, as will be described later in more detail.

As shown in FIG. 4, fluids entering either labyrinth seal system 20 or 220 will flow into fluid cavity 32, defined by projections 38 and 40 on the downstream end of each cavity 32, stator flow surface 42, surface 44 opposite projection 40 of rotor 24, and rotor flow surface 46. Fluid entering each cavity 32, will generally flow along stator flow surface 42 until it is redirected by projection 38, where the trapped fluid adopts a circular path indicated by arrow 48. The escape path for any fluid exiting chamber 32 is thus made through outlet orifice 34 which also functions as a portion of the inlet orifice for the next fluid cavity 32.

In order to escape through outlet orifice 34, fluid flow must re-curve and flow as indicated generally by arrows 50 in FIG. 4, thus undergoing designed turning or deflection from flow surfaces 42, 38, 46 and 44 of each cavity 32. This retroverted flow causes a considerable degree of turbulence in addition to turbulence which naturally results from the expansion of the fluid after it passes through inlet 30 into cavity 32. The preferred flow path shown by arrow 50 in FIG. 4 is one of extremely sharp curvature while at high velocity. By imparting such a curved motion to fluids entering each cavity 32, an unusually large portion of fluid pressure energy is transformed into flow turbulence which is then dissipated as heat energy. Areas of greatest velocity and hence highest turbulence are shown at points A in FIG. 4. Hence, the pressure of the fluid entering the following fluid cavity 32 is considerably reduced, which gives a reduced leakage rate across labyrinth seal systems 20 and 220.

It has been discovered that these principles of very high turbulence and energy dissipation may be optimized when the geometry of flow surfaces between relatively rotatable members (rotor 24 and stator 22) have been modified as shown in FIG. 5a through 18. An important feature of the various labyrinth seal systems shown in FIGS. 5a through 17 is the use of a mid-cavity orifice or throttle located between the inlet orifice and the outlet orifice of the fluid cavities.

Figure 18:
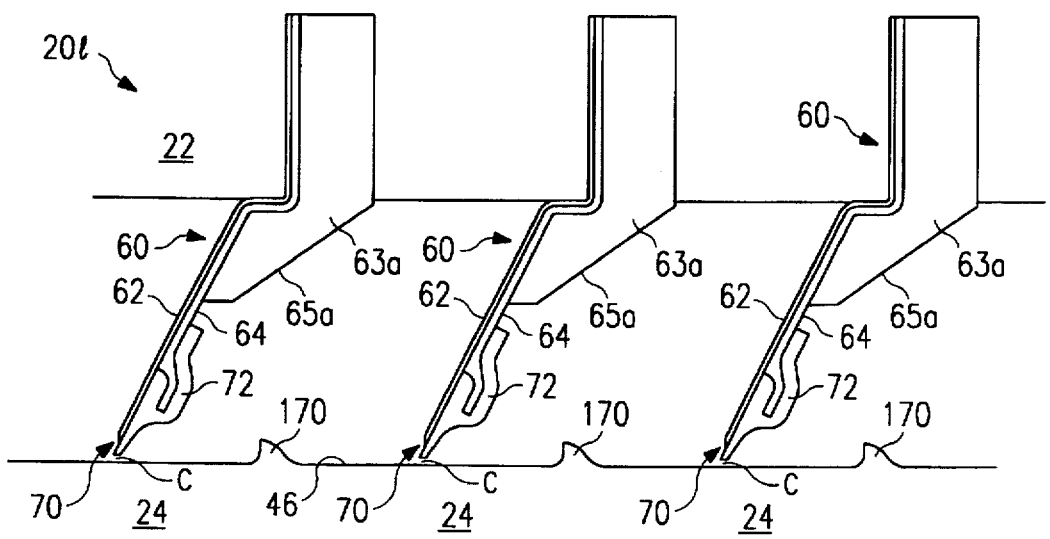
FIG. 18 is a schematic drawing in longitudinal section taken along the axis of rotation with portions broken away showing a labyrinth seal system with a plurality of flexible spring teeth assemblies and adjacent downstream flow deflector blocks disposed between a rotor and a stator.

For some embodiments of the present invention, flexible spring teeth assembly 60 may be disposed in selected fluid cavities between the inlet orifice and the outlet orifice. FIG. 5a is a radial cross-section showing rotor 24 and stator 22 with flexible spring teeth assembly 60 disposed therebetween. A plurality of spring teeth assemblies 60 as shown in FIG. 18 may be particularly beneficial for use on relatively long rotary shafts 26.

Spring teeth assembly 60 preferably includes a first set of spring teeth 62 and a second set of spring teeth 64 disposed adjacent to each other along with support ring 63a or 63b. First set of spring teeth 62 rest upon and are supported by the second set of spring teeth 64. The second set of spring teeth 64 in turn rest upon support ring 63a or 63b.

A plurality of first slots 66 are preferably formed between each tooth 62. Also, a plurality of second slots 68 are preferably formed between each tooth in the second set of spring teeth 64. Slots 66 and 68 cooperate with each other to provide the desired flexibility of spring teeth assembly 60 within the associated rotor 24 and stator 22. For some applications only one or two slots 66 and/or 68 may be required. In other applications, slots 66 and 68 may not be required.

The first set of spring teeth 62 are oriented with respect to the second set of spring teeth 64 such that each tooth 62 will block one second slot 68. In a similar manner, the second set of spring teeth 64 are oriented such that each tooth 64 will block fluid flow through first slot 66. This preferred alignment of spring teeth 62 and 64 results in fluid flow being directed between free end 70 of spring teeth assembly 60 and the adjacent surface 46 of rotor 24.

As shown in FIGS. 6a, 6b, 8a and 8b, various types of end fittings may be secured to free ends 70 of spring teeth assembly 60. End fittings 72, 74, 76 and 78 are preferably formed from material which is softer than adjacent surface 46 of rotor 24. Spring teeth 62 and 64 are generally formed from relatively hard material. If spring teeth 62 or 64 directly contact surface 46, they may possibly cause damage to rotor 24 and/or spring teeth assembly 60. By properly selecting the material for fabrication of end fittings 72, 74, 76 and 78, spring assembly 60 may be initially installed with free ends 70 resting upon the adjacent surface 46. Thus, during the first few hours of rotation of rotor 24 with respect to stator 22, a small amount of each end fitting 72, 74, 76 or 78 will be worn away without causing damage to adjacent surface 46. This small amount of wear establishes the desired minimum clearance between free end 70 and rotor surface 46.

The overlapping configuration of the first set of spring teeth 62 with the second set of spring teeth 64 and the minimum clearance established between free ends 70 and rotor surface 46 cooperate to provide an effective mid-cavity throttle within the associated fluid cavity. Also, the flexibility of spring teeth 62 and 64 will accommodate shaft vibration or whirl without causing damage to the other components of the labyrinth seal system.

In FIG. 5a, first slots 66 and second slots 68 are machined on a radius extending from the longitudinal axis of rotor 24. Modified spring assembly 60b is shown in FIG. 5b with first slots 66b machined at an acute angle relative a tangent extending from surface 46 of rotor 24. In FIG. 5b, this angle is shown as 45°. Other angles may be used as desired for optimum performance of the associated labyrinth seal system.

End fittings 72, 74, 76 and 78 may be attached to their associated spring teeth 62 and 64 by crimping, welding, brazing or other appropriate manufacturing techniques. For some selected applications, end fittings 72, 74, 76 and 78 may be formed as an integral part of the associated spring teeth. End fittings 72, 74, 76 and 78 may be formed from self-lubricating, polymeric materials or non-galling metal alloys as desired. End fitting 72 shown in FIGS. 6a and 7 has a relatively sharp point at its extreme lower end adjacent to surface 46. End fittings 74, 76 and 78 include an enlarged relatively flat surface disposed adjacent to surface 46.

End fitting 74, as shown in FIG. 6c, includes flat surface 80 enclosed on two sides by raised portions 82 and 84. Flat surface 80 and raised portions 82 and 84 cooperate with each other to provide fluid trap 80 between free ends 70 of flexible spring assembly 60 and surface 46 of rotor 24. Fluid trap 80 limits fluid flow on the exterior of rotor 24 adjacent to end fitting 74 and creates local pressure forces to lift free ends 70 of flexible spring teeth assembly 60 radially outward approximately 0.001 inches from surface 46. This lifting force establishes a very small clearance (C) which results in greatly increased downstream turbulence.

End fitting 76 also contains fluid trap 80. End fitting 78 includes a pair of fluid channels 88. Channels 88 increase turbulent intensity between end fitting 78 and rotor surface 46. As shown in FIGS. 8a and 8b, spring teeth assembly 60 may be oriented at various angles with respect to rotor 24 and also, with respect to fluid flow in the associated fluid cavity. The arrows in FIGS. 8a and 8b show the alternative directions for fluid flow.

Labyrinth seal system 20a shown in FIG. 6a includes spring teeth assembly 60 disposed between stator 22 and rotor 24 within fluid cavity 32. Fluid cavity 32 is defined in part by radial projections 52a and 54a extending from rotor 24. Free ends 70 of flexible spring teeth assembly 60 are disposed between radial projections 52a and 54a. Radial projection 52 has a pair of flow surfaces 53 which are formed parallel to each other and normal to the longitudinal axis of rotor 24. In the same manner, radial projection 54a includes a pair of flow surfaces 55 which are formed parallel to each other and normal to the longitudinal axis of rotor 24.

As will be explained later in more detail, the present invention includes various radial projection designs and configurations. These other designs and configurations may be used in labyrinth seal assemblies 20a through 20i as desired.

An important feature of spring teeth assembly 60 shown in FIG. 6a is the use of support ring 63a to secure the first set of spring teeth 62 and the second set of spring teeth 64 within stator 22. Support ring 63a also limits the amount of flexing of the first set of spring teeth 62 and the second set of spring teeth 64 which may be caused by fluid flow through the associated fluid cavity 32. For labyrinth seal system 20a, support ring 63a includes tapered surface 65a, which also cooperates with the adjacent radial projection 54 to direct fluid flow therebetween. End fitting 72 used in labyrinth seal system 20a may be described as a non-lifting tip.

Labyrinth seal system 20b incorporating alternative embodiments of the present invention is shown in FIG. 6b. Flexible spring teeth assembly 60 has been modified to include end fitting 74 which includes fluid trap 80. End fitting 74 may also be described as a lifting tip. Spring teeth assembly 60 includes modified support ring 63b with enlarged portion 65b, which substantially deflects fluid flow with respect to the adjacent radial projection 54b.

Labyrinth seal system 20b includes projections 52b and 54b which extend radially from rotor 24. Radial projection 52b includes flow surface 56 formed at an acute angle relative to the longitudinal axis of rotor 24 and a second flow surface 57 formed at a different angle relative to the longitudinal axis of rotor 24. Radial projection 54b includes a first flow surface 58 which is formed normal to the longitudinal axis of rotor 24, and a second surface 59 which has a convex radius of curvature. As will be explained later in more detail, placing convex surface 59 adjacent to a tight flow restriction such as enlarged portion 65b, substantially enhances the performance of the associated labyrinth seal system by increasing turbulence intensity therein.

FIG. 7 shows an enlarged isometric view of flexible spring teeth assembly 60 used with labyrinth seal system 20a of FIG. 6a. For some applications, it may be desirable to install flexible spring teeth assembly 60 secured to rotor 24 with free ends 70 disposed adjacent to flow surface 42 of stator 22. For other applications, stator 22 may have a relatively uniform inside diameter or flow surface 42 and rotor 24 may have a relatively uniform outside diameter or flow surface 46. For these types of labyrinth seal systems, a plurality of flexible spring teeth assemblies 60 may be installed between stator 22 and rotor 24. FIG. 18 is a schematic representation of such a labyrinth seal system.

Labyrinth seal systems 20c through 20l, which incorporate various embodiments of the present invention, are shown respectively in FIG. 9 through 18. Labyrinth seal systems 20c through 20l demonstrate various seal designs and configurations resulting from the present invention. The principal components used in the these various seal designs include convex surfaces 130, enlarged recess portions 140 provided in selected fluid cavities, a plurality of annular flow reversal grooves 150, flexible spring teeth assemblies 60, rough machined surfaces 160 on selected portions of the fluid cavities, a plurality of deflector blocks 170 disposed on selected flow surfaces within each fluid cavity and rigid teeth 136.

Dotted lines are used in FIGS. 9 through 17 to indicate that geometric designs of various components may be modified as desired to enhance the overall performance of the associated labyrinth seal system. For example, labyrinth seal system 20c in FIG. 9 includes an enlarged recess portion 140 represented by line 144. When labyrinth seal system 20c is used to control the flow of gas between rotor 24 and stator 22, enlarged recess portion 144 may be expanded. When labyrinth seal system 20c is used to restrict the flow of some types of liquids between stator 22 and rotor 24, enlarged recess portion may be reduced as indicated by line 144. The present invention allows modifying the recess portions to provide the optimum performance of the associated labyrinth seal system with respect to the specific type of fluid flowing therethrough.

An important feature of labyrinth seal systems 20c through 20k is the use of convex surfaces to guide fluid flow into selected portions of the labyrinth seal systems. Convex surfaces 130 shown in labyrinth seal system 20c serve as guide or direct fluid flow deep into the adjacent enlarged recess portion 140. Convex surfaces 130 create a low pressure or suction effect which directs fluid flow away from the primary fluid flow stream through the associated labyrinth seal system. By directing fluid flow deep into enlarged recess portion 140, turbulent intensity and the resulting dissipation of fluid pressure energy as thermal energy are increased which substantially reduces fluid pressure energy within labyrinth seal system 20c. Convex surfaces 130 are used at various locations within labyrinth seal systems 20c through 20k to direct fluid flow using this low pressure/suction effect.

Fluid flow into enlarged recess portion 140 and the resulting turbulent action is further enhanced by placing radial projection 132 from stator 22 adjacent to each convex surface 130. The resulting tight clearance (C) substantially enhances the performance of labyrinth seal system 20c.

A plurality of annular flow reversal grooves 150 are disposed in various portions of each labyrinth seal system 20c through 20k. Annular flow reversal grooves 150 have a semi-elliptical cross-section oriented to oppose the main fluid flow path through the respective labyrinth seal system. The semi-elliptical cross-section is preferred for annular flow reversal grooves 150 so that fluid exiting each groove 150 will oppose the main direction of fluid flow through the respective labyrinth seal system.

Figure 10:
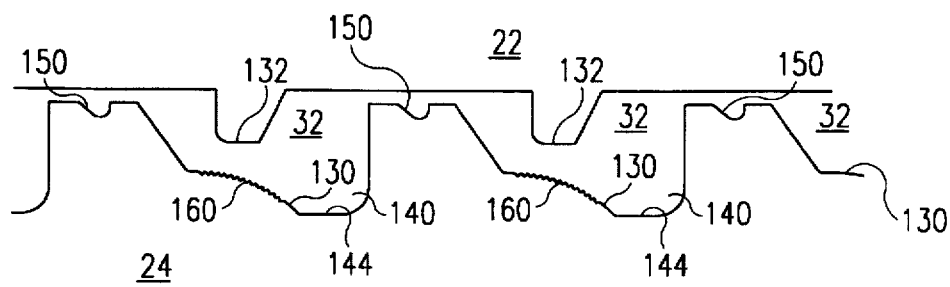
FIG. 10 is a schematic drawing in longitudinal section taken along the axis of rotation with portions broken away showing an alternative embodiment of the labyrinth seal system of FIG. 9 incorporating rough, machine surfaces in accordance with the present invention.

Labyrinth seal system 20d shown in FIG. 10 includes many of the same features as previously described for labyrinth seal system 20c and also includes rough surfaces 160. Rough surfaces 160 may be formed on various surfaces within the associated fluid cavity 32. For labyrinth seal system 20d, rough surfaces 160 have been formed on convex surfaces 130. In labyrinth seal system 20f of FIG. 12, rough surfaces 160 are formed on stator flow surfaces 42. Various types of surface finishes may be used to provide rough surfaces 160. These finishes include phonograph finishes, small spiral helix grooves and other types of machine threaded finishes. Rough surfaces 160 may be used to break up the boundary layer associated with fluid flow over the respective surface within the associated fluid cavity 32.

Small flow deflector blocks 170 may also be formed on selected surfaces within fluid cavities 32 to enhance turbulent fluid flow. Flow deflector blocks 170 are particularly effective when they are located adjacent to and downstream from a tight restriction in the main fluid flow path of the associated labyrinth seal system. For example, in labyrinth seal system 20j of FIG. 16, flow deflector blocks 170 are formed on rotor surface 46 and project into fluid channels 88. For this application, flow deflector blocks 170 are approximately equal in height to the clearance between the associated projection from stator 22 and rotor surface 46. The height of deflector blocks 170 may vary from approximately one third of clearance (C) to two or three times clearance (C). At other locations, flow deflector blocks 170 will break up boundary layer flow over the respective surface. The use of rough surfaces 160 and flow deflector blocks 170 as boundary layer breakers substantially enhances the intensity of turbulent flow within the associated labyrinth seal system and further dissipates fluid pressure energy in the form of heat energy.

Figure 11:
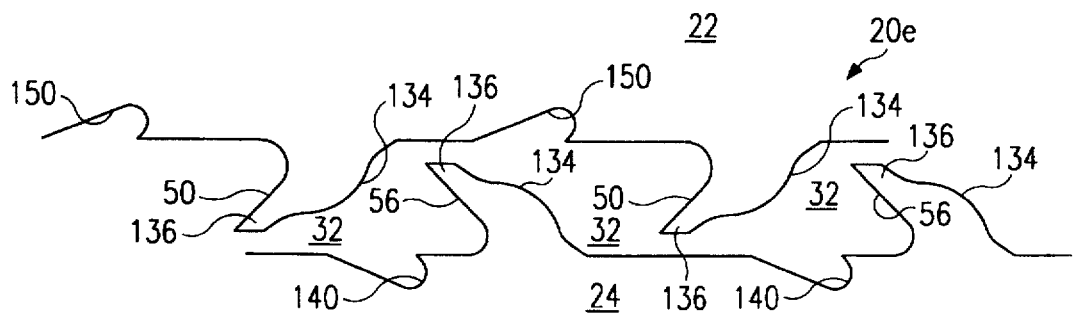
FIG. 11 is a schematic drawing in longitudinal section taken along the axis of rotation with portions broken away showing a labyrinth seal system with radial projections, sealing surfaces, fluid cavities and semi-elliptical annular grooves incorporating an alternative embodiment of the present invention.

Labyrinth seal system 20e as shown in FIG. 11 incorporates many of the features of previously described labyrinth seal systems 20c and 20d and also, includes a plurality of convex surfaces 134 formed on radial projections 136. Convex surfaces 134 may be used to guide fluid flow in the same manner as previously described for convex surface 130. Labyrinth seal system 20e includes a plurality of annular flow reversal grooves 150 disposed within the associated fluid cavities 32. If desired, enlarged annular recessed portions 140 as shown by dotted lines, may be included within selected portions of labyrinth seal system 20e. Fluid cavities 32 are defined, in part, by a plurality of projections 136 extending generally towards each other. Radial projections 136 may have various configurations, including flow surface 56 formed at an acute angle relative to the longitudinal axis of rotor 24 or flow surface 58 formed at an angle normal to the longitudinal axis of rotor 24. The solid line configuration of radial projections 136 as shown in FIG. 11 may be described as a plurality of interlocking fixed teeth disposed at an acute angle relative to the direction of fluid flow through labyrinth seal system 20e.

Figure 12:
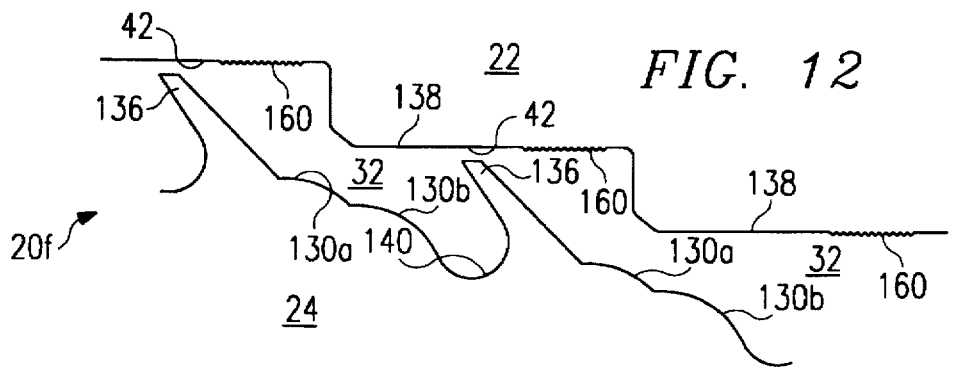
FIG. 12 is a schematic drawing in longitudinal section taken along the axis of rotation with portions broken away showing a labyrinth seal system with radially stepped projections, rough, machined surfaces, fluid cavities, and multiple convex surfaces incorporating the present invention.

Labyrinth seal system 20f as shown in FIG. 12 incorporates many of the same features as previously described for labyrinth seal systems 20c, d, and e and also includes multiple convex surfaces 130a and 130b within the associated fluid cavities 32. Labyrinth seal system 20f includes a plurality of fluid cavities 32 defined, in part, by projections or fixed teeth 136 extending radially from rotor 24 and stepped portions or radial projections 138 extending radially from stator 22. Fixed teeth 136 are disposed at an acute angle relative to the direction of fluid flow through labyrinth seal system 20f. If desired, end fittings 72, 74, 76, or 78 may be formed as an integral part of fixed teeth 136. By combining rough surfaces 160 with multiple convex surfaces 130a and 130b, along with enlarged recess portions 140, the performance of labyrinth seal system 20f is substantially enhanced.

Figure 13:
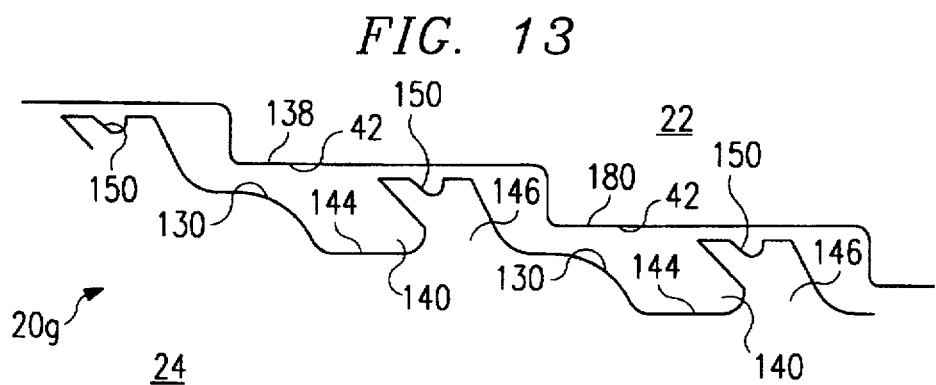
FIG. 13 is a schematic drawing in longitudinal section taken along the axis of rotation with portions broken away showing a labyrinth seal system with radial projections, sealing surfaces, fluid cavities with enlarged recess portions and semi-elliptical annular flow reversal grooves incorporating the present invention.
Figure 14:
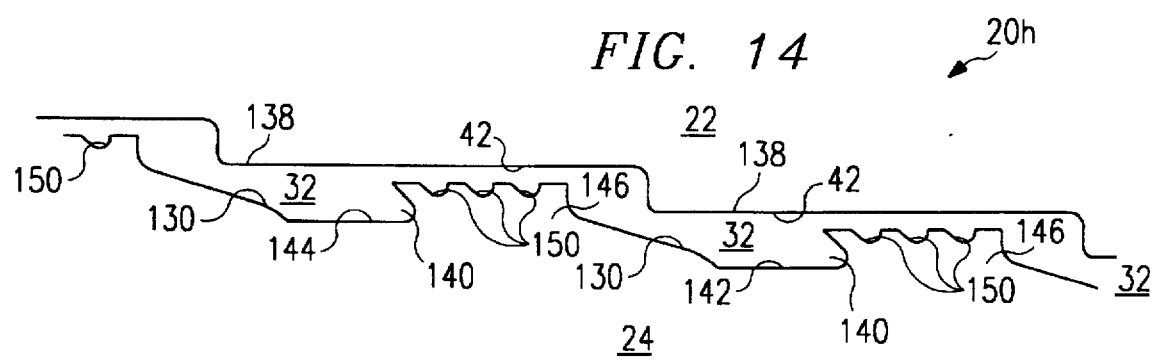
FIG. 14 is a schematic drawing in longitudinal section taken along the axis of rotation with portions broken away showing an alternative embodiment of the labyrinth seal system of FIG. 13 with radial projections, sealing surfaces, fluid cavities with enlarged recess portions and semi-elliptical annular flow reversal grooves incorporating the present invention.
Figure 15:
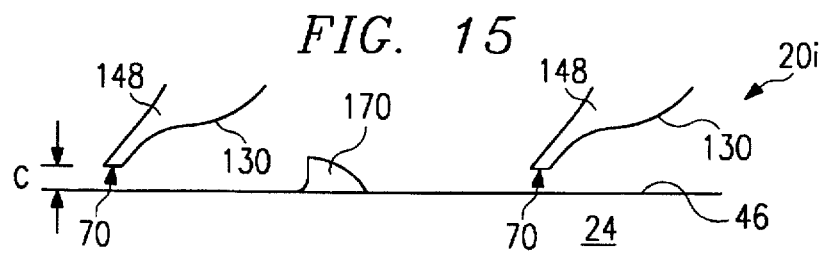
FIG. 15 is a schematic drawing in longitudinal section taken along the axis of rotation with portions broken away showing a labyrinth seal system with rigid teeth or flexible spring teeth, flow deflector blocks, convex sealing surfaces, and semi-elliptical annular flow reversal grooves incorporating the present invention.

Labyrinth seal systems 20g and 20h, as shown in FIGS. 13 and 14, respectively, include many of the same features as previously described for labyrinth seal systems 20c through 20f and also include the use of annular flow reversal grooves 150 disposed on projections 146 extending radially from rotor 24. For labyrinth seal system 20g, a single annular flow reversal groove 150 is formed on each radial projection 146 adjacent to stator surface 42. By placing annular flow reversal grooves on the end of radial projections 146, turbulent flow is substantially enhanced in the small clearance defined, in part, by the end of radial projection 146 and stator flow surface 42.

Labyrinth seal system 20i includes many of the features as described in the previous labyrinth seal systems. Labyrinth seal system 20i includes a plurality of teeth 148, flow deflector blocks 170 and annular flow reversal grooves 150 as desired. Teeth 148 may either be similar to flexible spring teeth assembly 60 or rigid teeth 136. Clearance (C) is defined as the distance between end 70 of teeth 148 and the adjacent surface 46 of rotor 24. The height of deflector blocks 170 may vary from approximately one third of clearance (C) to two or three times clearance (C). Turbulent flow through labyrinth seal system 20i is dramatically enhanced by cooperation between small clearance (C), convex surface 130 and the adjacent flow deflector block 170.

Figure 16:
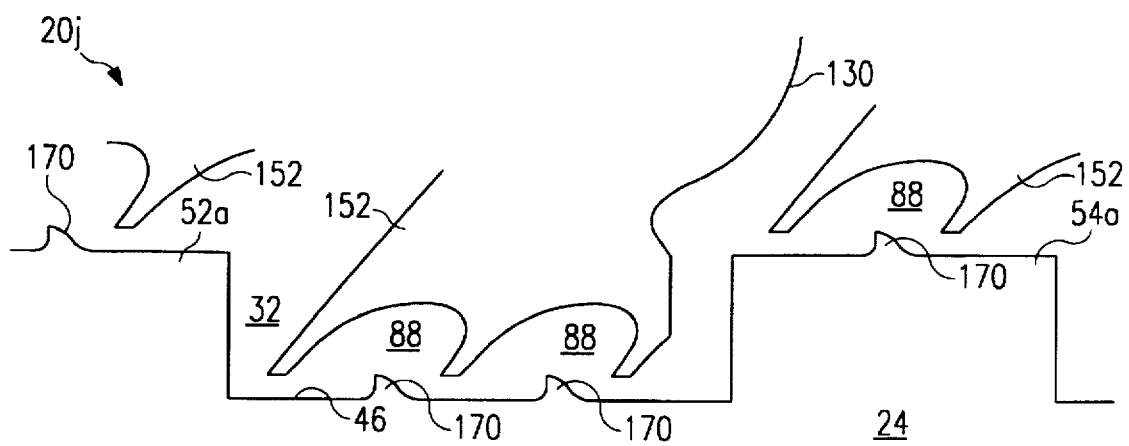
FIG. 16 is a schematic drawing in longitudinal section taken along the axis of rotation with portions broken away showing a labyrinth seal system with radial projections, boundary layer breakers, fluid cavities, semi-elliptical annular flow reversal grooves, and rigid teeth or flexible spring teeth incorporating the present invention.

Labyrinth seal system 20j of FIG. 16 includes many of the same features as previously described with respect to labyrinth seal systems 20a through 20i and also includes teeth 152 with fluid channels 88 and deflector blocks 170. Teeth 152 may be similar to flexible spring teeth assembly 60 with end fitting 78 or fixed teeth 146 with convex surfaces 130. Fluid channels 88 in selected teeth 152 are preferably aligned with flow deflector blocks 170 formed on surface 46 of rotor 24. The interaction of flow deflector blocks 170 and fluid channels 88 substantially enhances turbulent flow within labyrinth seal system 20j. The longitudinal spacing between radial projection 52a and 54a may be selected to optimize the performance of teeth 152 disposed therebetween. For some applications the longitudinal spacing between projections 52a and 54a may be increased to allow for ease of manufacture and assembly. Also, teeth 152 may be disposed between radial projections 52a and 54a or adjacent to the extreme end of radial projections 52a and 54a as shown in FIG. 16.

Figure 17:
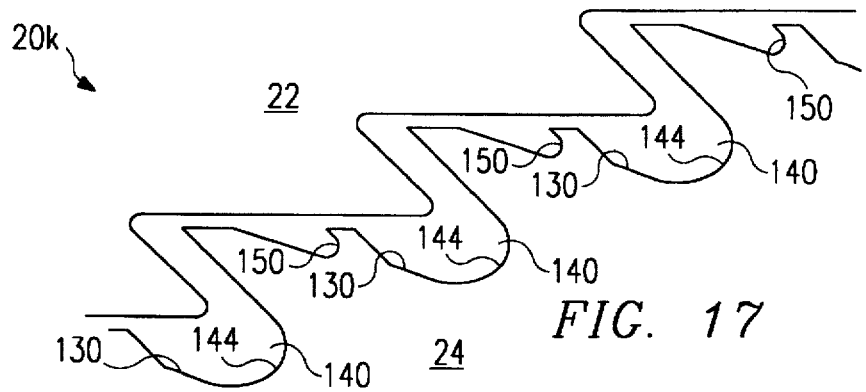
FIG. 17 is a schematic drawing in longitudinal section taken along the axis of rotation with portions broken away showing a labyrinth seal system with radially stepped projections, sealing surfaces, fluid cavities and semi-elliptical annular flow reversal grooves incorporating the present invention.

Labyrinth seal system 20k, as shown in FIG. 17, includes many of the same features as previously described for the above labyrinth seal systems. Labyrinth seal system 20k demonstrates that the present invention may be used with labyrinth seal systems which are either stepped radially outward, or radially inward with respect to the longitudinal axis of rotor 24.

As shown in FIGS. 5a through 18, the present invention allows maximizing the amount of turbulence generated within the associated labyrinth seal system. As previously described, these components cooperate with each other to maximize turbulence and dissipation of fluid pressure energy as thermal energy. The dimensions of these components may be modified for optimum fluid performance.

Although the present invention and its advantages have been described in detail, it should be understood that various changes, substitutions and alterations can be made therein without departing from the spirit and scope of the invention as defined by the appended claims.

We claim:

1. A labyrinth seal system for restricting fluid flow from a high pressure area to a low pressure area along a rotary shaft disposed within a stationary housing comprising:

a stator provided by the stationary housing;

a rotor formed on a portion of the rotary shaft disposed within the stationary housing adjacent to the stator;

a plurality of fluid cavities disposed between the exterior of the rotor and the interior of the stator;

an annular inlet orifice and an annular outlet orifice for each fluid cavity with the outlet orifice of one fluid cavity serving as the inlet orifice for an adjacent fluid cavity;

selected fluid cavities having interior surfaces defined in part by an exterior portion of the rotor, an interior portion of the stator and at least a first axially spaced radial projection and at least a second axially space radial projection extending from one of the rotor and the stator towards the other of the rotor and the stator;

the annular inlet orifices and the annular outlet orifices for the selected fluid cavities defined in part by the first and second radial projections from one of the rotor and the stator;

the first and the second radial projections each having a high pressure side and a low pressure side;

at least one recess formed in each fluid cavity between the respective first and second radial projections;

a convex surface formed on the low pressure side of at least one of the first and second radial projections within each fluid cavity;

at least a third radial projection formed within each fluid cavity and disposed adjacent to the convex surface to provide a reduced clearance for fluid flow therebetween; and the convex surface and the associated third radial projection cooperating with each other to form the reduced clearance to enhance free shear friction of fluid flow within the respective cavity.

2. The labyrinth seal system as defined in claim 1 wherein the convex surface further comprises means for directing fluid flow into the recess formed in the associated fluid cavity to further enhance free shear friction of fluid flow within the associated fluid cavity.

3. The labyrinth seal system as defined in claim 1 further comprising:

a groove formed in at least one radial projection from the stator; and the groove having a partially elliptical cross-section oriented to oppose fluid flow through the labyrinth seal system.

4. The labyrinth seal system as defined in claim 1 further comprising:

a groove formed in at least one radial projection from the rotor; and the groove having a partially elliptical cross-section oriented to oppose fluid flow through the labyrinth seal system.

5. The labyrinth seal system as defined in claim 1 further comprising at least one flow deflector block formed in part by at least one of the third radial projections disposed on at least one interior surface of each selected fluid cavity for breaking boundary layer fluid flow over the respective interior surface to further enhance free shear friction of fluid flow within the selected fluid cavity.

6. The labyrinth seal system as defined in claim 1 further comprising one or more rough, machined surfaces formed on selected portions of each fluid cavity.

7. The labyrinth seal system as defined in claim 1 further comprising multiple convex surfaces on the low pressure side of at least one of the radial projections associated with each selected fluid cavity.

8. The labyrinth seal system as defined in claim 1 wherein each fluid cavity further comprises:

the annular inlet orifice being defined in part by the clearance between the third radial projection and the convex surface formed on the low pressure side of one of the first and second radial projections; and the clearance selected to be greater than any anticipated movement of the rotor relative to the stator due to changing load conditions on the rotary shaft.

9. The labyrinth seal system as defined in claim 1 wherein the selected fluid cavities further comprise:

the at least one recess having an enlarged recess portion projecting into the rotor;

the convex surface providing a guide for fluid flow into the enlarged recess portion of the fluid cavity; and the convex surface and enlarged recess portion of the fluid cavity cooperating to maintain a more uniform leakage rate of fluid flow between the rotor and the stator as the difference in fluid pressure across the labyrinth seal system varies.

10. A method for providing a labyrinth seal system to restrict fluid flow from a high pressure area to a low pressure area on a rotating shaft having a rotor disposed within a stationary housing having a stator comprising the steps of:

forming a plurality of radial projections extending from one of the rotor and the stator generally towards the other of the rotor and the stator with each radial projection having a high pressure side and a low pressure side;

spacing the radial projections apart from each other to form at least one cavity having interior surfaces defined in part by an exterior portion of the rotor and an interior portion of the stator;

forming a respective gap between a respective free end of at least a first and a second of the plurality of radial projections and the interior surface of one of the rotor and the stator to partially define respectively an annular inlet orifice for one fluid cavity and an annular outlet orifice for the one fluid cavity which also functions as an annular inlet orifice for an adjacent fluid cavity;

forming at least the first and the second radial projections on a same interior surface of one of the rotor and the stator;

forming the annular inlet orifice and the annular outlet orifice of the at least one fluid cavity with approximately the same radius relative to the rotating shaft;

placing a flow deflector block on at least one interior surface of the rotor and the stator not having the first and the second radial projections formed thereon to provide a fluid flow restriction within the at least one fluid cavity between its annular inlet orifice and its annular outlet orifice to provide a mid-cavity throttle to further enhance free shear friction of fluid flow within the associated fluid cavity; and forming the flow deflector block with a height in the range of one third the height of the gap at the associated annular inlet orifice and three times the height of the gap at the associated annular inlet orifice to deflect fluid flow away from the interior surface having the flow deflector block resulting in the enhanced free shear friction of fluid flow within the associated fluid cavity.

11. The method of providing the labyrinth seal system as defined in claim 10, further comprising the step of forming a convex surface on the low pressure side of at least one of the first and the second radial projections associated with each fluid cavity to further enhance free shear friction of fluid flow within the associated fluid cavity.

12. A method for providing a labyrinth seal system to restrict fluid flow from a high pressure area to a low pressure area on a rotating shaft having a rotor disposed within a stationary housing having a stator comprising the steps of:

forming a plurity of projections from the rotor and the stator extending generally towards each other with projection having a high pressure side and a low pressure side;

spacing the projections from the rotor and the station apart from each other to partially define fluid cavities therebetween;

forming a gap between selected radial projections to partially define both an annular outlet orifice for one fluid cavity and an annular inlet orfice for an adjacent fluid cavity;

placing a flow restriction within each fluid cavity between its inlet orifice and its outlet orifice to provide a mid-cavity throttle to further enhance free shear friction of fluid flow within the associated fluid cavity;

forming a convex surface on the low pressure side of at least one projection associated with each fluid cavity to further enhance free shear friction of fluid flow within the associated fluid cavity;

placing at least one annular flow reversal groove in at least one fluid cavity; and optimizing the location, size and number of the annular flow reversal grooves relative to the associated convex surface to achieve enhanced turbulent fluid flow.

13. The method of providing the labyrinth seal system as defined in claim 12 further comprising the steps of placing a plurality of boundary layer breakers on selected interior surfaces of each fluid cavity to further enhance free shear friction of fluid flow within the associated fluid cavity.

14. The method of providing the labyrinth seal system as defined in claim 10 wherein the step of placing a flow restriction within each cavity further comprises the step of forming at least one flow reversal groove in the at least one interior surface of the rotor and the stator not having the first and the second radial projections formed thereon to cooperate with the radial projection which partially defines the associated annular inlet orifice to further enhance free shear friction of fluid flow within the associated fluid cavity.

15. The method of providing the labyrinth seal system as defined in claim 10, further comprising the step of forming a rough surface on selected portions of the associated fluid cavity.

16. A labyrinth seal system for restricting fluid flow from a high pressure area to a low pressure area along a rotary shaft assembly disposed within a stationary housing comprising:

a stator provided by the stationary housing;

a rotor formed on a portion of the rotary shaft assembly disposed within the stationary housing adjacent to the stator;

a plurality of fluid cavities disposed between the exterior of the rotary shaft assembly and the interior of the stator;

an annular inlet orifice and an annular outlet orifice for each fluid cavity with the outlet orifice of one fluid cavity serving as the inlet orifice for an adjacent fluid cavity;

each fluid cavity having interior surfaces defined in part by an exterior portion of the rotary shaft assembly, an interior portion of the stator and at least a first and a second axially spaced radial projection from one of the rotary shaft assembly and the stator with the first and the second radial projections formed on the same one of the rotary shaft assembly and the stator and extending toward the other of the rotary shaft assembly and the stator;

each of the first and the second radial projections from the same one of the rotary shaft assembly and the stator having a high pressure side and a low pressure side;

the first radial projection defining in part the annular inlet orifice for the respective fluid cavity and the second radial projection defining in part both the annular outlet orifice for the respective fluid cavity and the annular inlet orifice for an adjacent cavity; and a flow deflector block formed on one of the interior surfaces of each fluid cavity adjacent to the radial projection which defines in part the associated annular inlet orifice to enhance free shear friction of fluid flow within the respective fluid cavity.

17. The labyrinth seal system as defined in claim 16 further comprising:

a convex surface formed on the low pressure side of at least one of the first and the second radial projections of each fluid cavity; and the convex surface providing means for directing fluid flow into an enlarged recess portion in the associated fluid cavity.

18. The labyrinth seal system as defined in claim 16 further comprising:

a plurality of grooves formed in selected first and second radial projections from the stator; and each groove oriented to oppose fluid flow through the labyrinth seal system.

19. The labyrinth seal system as defined in claim 16 further comprising:

a plurality of grooves in selected first and second radial projections from the rotor; and each groove oriented to oppose fluid flow through the labyrinth seal system.

20. The labyrinth seal system as defined in claim 16 further comprising:

a plurality of grooves formed in portions of the stator;

a plurality of grooves formed in portions of the rotor; and each groove having a partially elliptical cross-section oriented to oppose fluid flow through the labyrinth seal system.

21. The labyrinth seal system as defined in claim 20 wherein the grooves comprise means for turning the direction of fluid flow within the cavities and increasing fluid friction with the fluid flow stream in the associated fluid cavity prior to the fluid flow stream reaching the associated annular outlet orifice.

22. The labyrinth seal system as defined in claim 17 further comprising multiple convex surfaces on the low pressure side of at least one of the first and the second radial projections.

23. The labyrinth seal system as defined in claim 16 wherein each fluid cavity further comprises:

the first radial projection and the second radial projection formed on the rotor;

a third radial projection formed on the stator within the fluid cavity adjacent to the first radial projection;

the annular inlet orifice being defined in part by a clearance between the first radial projection from the rotor and the third radial projection from the stator; and the clearance selected to be greater than any anticipated movement of the rotor relative to the stator due to changing load conditions on the rotary shaft assembly.

24. The labyrinth seal system as defined in claim 16 wherein each fluid cavity further comprises:

the first radial projection and the second radial projection formed on the stator;

a third radial projection formed on the rotor within the fluid cavity;

the annular inlet orifice being defined in part by a clearance between the first radial projection from the stator and the third radial projection from the rotor; and the clearance selected to be greater than any anticipated movement of the rotor relative to the stator due to changing load conditions on the rotary shaft assembly.

25. The labyrinth seal system as defined in claim 17 wherein each fluid cavity further comprises:

a recess having an enlarged portion projecting into the stator;

the convex surface providing a flow path into the enlarged portion of the recess of each fluid cavity; and the convex surface and the enlarged portion of the recess of each fluid cavity cooperating to maintain a more uniform leakage rate of fluid flow between the rotor and the stator as the difference in fluid pressure across the labyrinth seal system varies.

26. The labyrinth seal system as defined in claim 17 wherein each fluid cavity further comprises:

a recess having an enlarged portion projecting into the rotor;

the convex surface providing a flow path into the enlarged portion of the recess of each fluid cavity; and the convex surface and the enlarged portion of the recess of each fluid cavity cooperating to maintain a more uniform leakage rate of fluid flow between the rotor and the stator as the difference in fluid pressure across the labyrinth seal system varies.

27. The labyrinth seal system as defined in claim 16 wherein at least one of the first and the second radial projections further comprises a first surface and a second surface disposed parallel with each other and normal to the longitudinal axis of the rotary shaft assembly.

28. The labyrinth seal system as defined in claim 16 wherein at least one of the first and the second radial projections further comprises a first surface disposed normal to the longitudinal axis of the rotary shaft assembly.

29. The labyrinth seal system as defined in claim 16 wherein at least one of the first and the second radial projections further comprises a first concave surface on the high pressure side of one of the first and the second radial projections and a second convex surface on the low pressure side of the one radial projection.

30. The labyrinth seal system as defined in claim 16 wherein at least one of the first and the second radial projections further comprises a first convex surface on the high pressure side of the one of the first and the second radial projections and a second convex surface disposed on the low pressure side of the radial projection.

31. The labyrinth seal system as defined in claim 16 wherein at least one of the first and the second radial projections further comprises a first surface formed at an acute angle relative to the longitudinal axis of the rotary shaft assembly and a second surface formed at an acute angle relative to the longitudinal axis of the rotary shaft assembly.

32. The labyrinth seal system as defined in claim 16 wherein at least one of the first and the second radial projections further comprises a first surface having a plurality of annular flow reversal grooves and a second surface disposed at an acute angle relative to the longitudinal axis of the rotary shaft assembly to enhance free shear friction of fluid flow within the respective cavity.

33. The labyrinth seal system as defined in claim 16 further comprising an abradable material covering at least a portion of one of the interior surfaces within selected fluid cavities.

34. A labyrinth seal system for restricting fluid flow from a high pressure area to a low pressure area along a rotary shaft assembly disposed within a stationary housing comprising:

a stator formed on the interior of the stationary housing;

a rotor formed on a portion of the rotary shaft assembly disposed within the stationary housing adjacent to the stator;

at least two fluid cavities disposed between an exterior portion of the rotor and an interior portion of the stator;

an annular inlet orifice and an annular outlet orifice for each fluid cavity with the outlet orifice of one fluid cavity serving as the inlet orifice for an adjacent fluid cavity;

each fluid cavity having interior surfaces defined in part by a portion of the outside diameter of the rotor, the inside diameter of the stator and at least two longitudinally spaced radial projections formed on the same one of the rotor and the stator;

the annular inlet orifice and the annular outlet orifice for each fluid cavity defined in part by the at least two longitudinally spaced radial projections;

the annular inlet orifice and the annular outlet orifice for each fluid cavity having approximately the same radius relative to the rotary shaft assembly to provide a respective small clearance which will accommodate fluid flow in a generally straight line path along the rotary shaft assembly;

each of the at least two radial projections having a high pressure side and a low pressure side;

the at least two radial projections defining in part the respective small clearance for fluid flow through each fluid cavity at the corresponding annular inlet orifice and annular outlet orifice;

a flow deflector block structured and located on an interior surface of the rotor and the stator not having the at least two radial projections formed thereon within at least one fluid cavity downstream from the small clearance associated with one of the at least two respective radial projections which defines in part the respective annular inlet orifice;

the flow deflector block causing sufficient deflection in fluid flow in the generally straight line path between the respective annular inlet orifice and the respective annular outlet orifice to enhance free shear friction of fluid flow; and the flow deflector block having a height in the range of approximately one third the height of the small clearance at the respective annular inlet orifice to three times the height of the small clearance at the respective annular inlet orifice, whereby fluid flow between the inlet orifice and the outlet orifice is deflected from the respective interior surface having the flow deflector block to maximize free shear friction of fluid flow within the associated fluid cavity relative to the exterior portion of the rotor within the associated fluid cavity.

35. A labyrinth seal system for restricting fluid flow from a high pressure area to a low pressure area along a rotary shaft assembly disposed within a stationary housing comprising:

a stator provided by the stationary housing;

a rotor formed on a portion of the rotary shaft assembly disposed within the stationary housing adjacent to the stator;

at least one fluid cavity disposed between an exterior portion of the rotary shaft assembly and an interior portion of the stator;

an annular inlet orifice and an annular outlet orifice for each fluid cavity formed by portions of the rotor and stator in cooperation with at least two radial projections spaced longitudinally from each other and formed on the same one of the rotor and the stator to establish in part a fluid flow path between the annular inlet orifice and the annular outlet orifice;

each fluid cavity having interior surfaces defined in part by the respective exterior portion of the rotary shaft assembly and the respective interior portion of the stator and the at least two longitudinally spaced radial projections;

each of the at least two longitudinally spaced radial projections having a high pressure side and a low pressure side;

an annular flow reversal groove formed within the fluid cavity between the annular inlet orifice and the annular outlet orifice within the interior surface of the rotor and the stator not having the at least two radial projections formed thereon; and each annular flow reversal groove having a location and size selected with respect to the at least two longitudinally spaced radial projections forming the fluid cavity to achieve enhanced turbulent fluid flow through the fluid cavity to increase free shear friction of fluid flow within the cavity.

\* \* \* \* \*

UNITED STATES PATENT AND TRADEMARK OFFICE
CERTIFICATE OF CORRECTION

PATENT NO. : 5,639,095
DATED : June 17, 1997
INVENTOR(S) : Rhode

It is certified that error appears in the above-identified patent and that said Letters Patent is hereby corrected as shown below:

Column 2, line 9, after "substantially", delete "reduce", and insert
-- reduced --;

Column 2, line 51, after "i.e.", insert -- , --.

Column 11, line 22, after "in", delete "FIGURE", and insert -- FIGUREs --;

Column 11, line 25, after "in", delete "the";

Column 11, line 52, after "guide", delete "or", and insert -- for --.

Signed and Sealed this

Seventh Day of October, 1997

Attest:

BRUCE LEHMAN

*Attesting Officer*   Commissioner of Patents and Trademarks